United States Patent
Lee

(10) Patent No.: US 8,155,196 B2
(45) Date of Patent: Apr. 10, 2012

(54) METHOD OF AND APPARATUS FOR ESTIMATING MOTION VECTOR BASED ON SIZES OF NEIGHBORING PARTITIONS, ENCODER, DECODING, AND DECODING METHOD

(75) Inventor: Tammy Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1398 days.

(21) Appl. No.: 11/783,773

(22) Filed: Apr. 12, 2007

(65) Prior Publication Data

US 2008/0159394 A1 Jul. 3, 2008

(30) Foreign Application Priority Data

Jan. 3, 2007 (KR) ........................ 10-2007-0000711

(51) Int. Cl.
*H04N 7/12* (2006.01)
(52) U.S. Cl. ............................ 375/240.16; 375/240.12
(58) Field of Classification Search ............ 375/240.12, 375/240.13, 240.14, 240.15, 240.16, 240.17, 375/240.23, 240.24
See application file for complete search history.

(56) References Cited

U.S. PATENT DOCUMENTS

| 6,219,383 B1 | 4/2001 | Park |
| 2006/0018382 A1* | 1/2006 | Shi et al. .................. 375/240.16 |
| 2006/0083309 A1* | 4/2006 | Schwarz et al. ......... 375/240.16 |

FOREIGN PATENT DOCUMENTS

| EP | 0691789 A2 | 1/1996 |
| EP | 1061747 A1 | 12/2000 |

\* cited by examiner

*Primary Examiner* — Gilberto Barron, Jr.
*Assistant Examiner* — Malcolm Cribbs
(74) *Attorney, Agent, or Firm* — Sughrue Mion, PLLC

(57) ABSTRACT

Provided are a method of and apparatus for estimating a motion vector using the sizes of neighboring partitions, an encoder, a decoder, and a decoding method. The method includes comparing the size of a first neighboring partition located to the left of the current block with the size of a second neighboring partition located above the current block and, if the size of the first neighboring partition and the size of the second neighboring partition are different from each other, estimating a motion vector of the larger one of the first neighboring partition and the second neighboring partition as the motion vector of the current block.

24 Claims, 5 Drawing Sheets

METHOD OF AND APPARATUS FOR ESTIMATING MOTION VECTOR BASED ON SIZES OF NEIGHBORING PARTITIONS, ENCODER, DECODING, AND DECODING METHOD

CROSS-REFERENCE TO RELATED PATENT APPLICATION

This application claims the benefit of Korean Patent Application No. 10-2007-0000711, filed on Jan. 3, 2007, in the Korean Intellectual Property Office, the disclosure of which is incorporated herein in its entirety by reference.

BACKGROUND OF THE INVENTION

1. Field of the Invention

Methods and apparatuses consistent with the present invention generally relate to video coding, and more particularly, to a method of and apparatus for estimating a motion vector based on the sizes of neighboring partitions, an encoder, a decoder, and a decoding method.

2. Description of the Related Art

Inter-frame and intra-frame predictions are main video encoding techniques. The intra-frame prediction uses a high correlation between gray levels of adjacent pixels in a single frame. The inter-frame prediction uses similarities between consecutive frames in a video sequence. As long as a sharp change does not occur in a moving picture, many parts of the moving picture change little between consecutive frames. In particular, motion-vector estimation is one of video encoding techniques used in the inter-frame prediction. The motion-vector estimation is designed to process an image by differentially encoding motion vectors obtained by motion estimation. Generally, a motion vector of a block has a close correlation with a motion vector of a neighboring partition. For this reason, the amount of bits to be encoded can be reduced by predicting a current block from the neighboring partition and encoding only a differential vector between the current block and a prediction block.

FIG. 1 illustrates neighboring partitions used for conventional motion estimation.

Referring to FIG. 1, a current macroblock E and its neighboring partitions A, B, and C are the same in shape and predictive encoding of a motion vector uses the median value of horizontal components and vertical components of motion vectors of a block A located to the left of the current block E, a block B located above the current block E, and a block C located above and to the right of the current block E. A skip macroblock mode is implemented in this way.

Direct mode prediction in H.264 is based on the assumption that there is a high spatial correlation in a video sequence. In other words, motion vectors of spatially adjacent blocks may have a high correlation therebetween, especially when they are included in the same object. Moving Picture Experts Group (MPEG)-4 uses a skip macroblock mode in which pixels that are located in the spatially same position as a macroblock, i.e., pixels having a motion vector of 0, are used as an encoded image without using information of the macroblock. Although a skip macroblock mode also exists in H.264, it uses a prediction signal, which is obtained by motion compensation using a motion vector predictor, as an encoded signal without meaning "motion vector of 0". In other words, since a motion vector can be accurately estimated using a neighboring partition in an image having a unidirectional motion according to H.264, encoding efficiency can be improved when compared to MPEG-4 that uses "motion vector of 0". Thus, the skip macroblock mode is selected mainly for a background object. A spatial direct mode is also used in a similar manner to the skip macroblock mode.

According to H.264, when a motion vector of a neighbor partition (block A or B in FIG. 1) is 0, a motion vector of the current block E is also estimated as 0 on the assumption that the current block E has a similar motion as in the case with the neighboring partition. However, this assumption does not match not only in a case where the current block and its neighbor partition are included in the same object, e.g., a background object, but also in a case where they are included in different objects.

SUMMARY OF THE INVENTION

The present invention provides a method of and apparatus for estimating a motion vector to the exclusion of an assumption made by H.264 that a motion vector of a current block is estimated as 0 when a motion vector of a neighboring partition around the current block is 0.

According to one aspect of the present invention, there is provided a method of estimating a motion vector of a current block using motion vectors of neighboring partitions around the current block. The method includes comparing the size of a first neighboring partition located to the left of the current block with the size of a second neighboring partition located above the current block and, if the size of the first neighboring partition and the size of the second neighboring partition are different from each other, estimating a motion vector of the larger one of the first neighboring partition and the second neighboring partition as the motion vector of the current block.

According to another aspect of the present invention, there is provided a computer-readable recording medium having recorded thereon a program for implementing the method of estimating a motion vector of a current block using motion vectors of neighboring partitions around the current block.

According to another aspect of the present invention, there is provided an apparatus for estimating a motion vector of a current block using motion vectors of neighboring partitions around the current block. The apparatus includes a partition size comparison unit comparing the size of a first neighboring partition located to the left of the current block with the size of a second neighboring partition located above the current block and a motion vector estimation unit, if the size of the first neighboring partition and the size of the second neighboring partition are different from each other, estimating a motion vector of the larger one of the first neighboring partition and the second neighboring partition as the motion vector of the current block.

According to another aspect of the present invention, there is provided a video encoder including a motion vector estimation apparatus and an entropy-coding unit. The motion vector estimation apparatus compares the size of a first neighboring partition located to the left of the current block with the size of a second neighboring partition located above the current block and, if the size of the first neighboring partition and the size of the second neighboring partition are different from each other according to the comparison result, estimates a motion vector of the larger one of the first neighboring partition and the second neighboring partition as the motion vector of the current block. The entropy-coding unit performs entropy-coding on mode information of the current block.

According to another aspect of the present invention, there is provided a video decoder including an entropy-decoding unit, a motion vector estimation unit, and a macroblock reconstruction unit. The entropy-decoding unit performs entropy-decoding on a residual block and mode information of a current block from an encoded bitstream. The motion vector estimation unit compares the size of a first neighboring partition located to the left of the current block with the size of a second neighboring partition located above the current block based on the decoded mode information and estimates a motion vector of the larger one of the first neighboring partition and the second neighboring partition as the motion vector of the current block according to the comparison result. The macroblock reconstruction unit reconstructs the current block from the decoded residual block using the estimated motion vector.

According to another aspect of the present invention, there is provided a decoding method. The decoding method includes performing entropy-decoding on a residual block and mode information from an encoded bitstream, comparing the size of a first neighboring partition located to the left of the current block with the size of a second neighboring partition located above the current block based on the decoded mode information, estimating a motion vector of the larger one of the first neighboring partition and the second neighboring partition as the motion vector of the current block according to the comparison result, and reconstructing the current block from the decoded residual block using the estimated motion vector.

According to another aspect of the present invention, there is provided a computer-readable recording medium having recorded thereon a program for implementing the decoding method.

The first partition neighboring partition may be located uppermost among neighboring partitions located to the left of the current block and the second neighboring partition may be located leftmost among neighboring partitions located above the current block.

The current block may be composed of 16×16 pixels, and the first neighboring partition and the second neighboring partition may have different sizes varying among 16×16, 16×8, 8×16, 8×4, 4×8, and 4×4.

BRIEF DESCRIPTION OF THE DRAWINGS

The above and other features and aspects of the present invention will become more apparent by describing in detail an exemplary embodiment thereof with reference to the attached drawings in which.

DETAILED DESCRIPTION OF THE INVENTION

Figure 1:
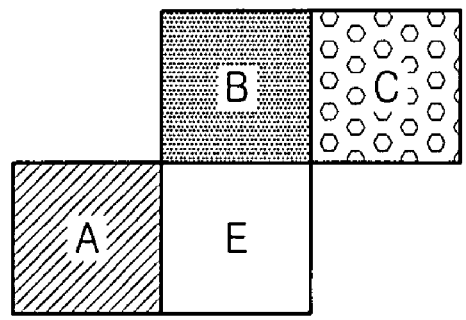
FIG. 1 illustrates neighboring partitions used to estimate a motion vector of a current block according to the prior art.

Hereinafter, an exemplary embodiment of the present invention will be described in detail with reference to the accompanying drawings. It should be noticed that like reference numerals refer to like elements illustrated in one or more of the drawings. It would be obvious to those skilled in the art that many specifics like elements of a circuit are provided only to facilitate understanding of the present invention and the present invention can be implemented without those specifics. In the following description of the present invention, a detailed description of known functions and configurations incorporated herein will be omitted for conciseness and clarity.

Figure 2:
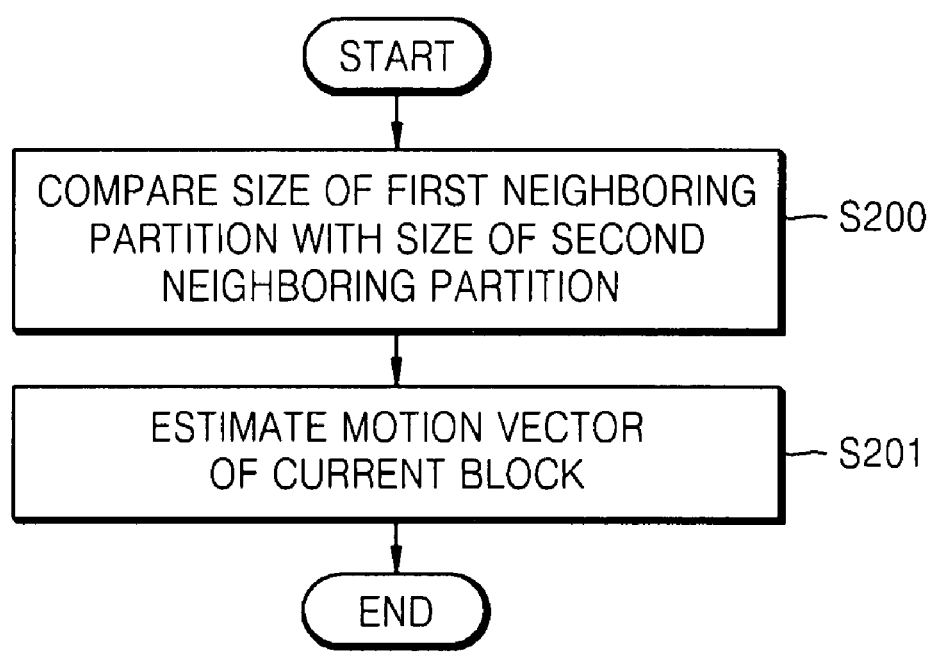
FIG. 2 is a flowchart of a method of estimating a motion vector using the sizes of neighboring partitions according to an exemplary embodiment of the present invention.

FIG. 2 is a flowchart of a method of estimating a motion vector using the sizes of neighboring partitions according to an exemplary embodiment of the present invention.

Referring to FIG. 2, the size of a first neighboring partition located to the left of a current block and the size of a second neighboring partition located above the current block are compared with each other in operation S200.

The first neighboring partition may be located uppermost among neighboring partitions located on the left of the current block and the second neighboring partition may be located leftmost among neighboring partitions located above the current block. The current block may be a macroblock composed of 16×16 pixels. The first neighboring partition and the second neighboring partition may have different sizes varying among 16×16, 16×8, 8×16, 8×4, 4×8, and 4×4.

In operation 201, when the first neighboring partition and the second neighboring partition have different sizes, a motion vector of the larger one between the first neighboring partition and the second neighboring partition is estimated as a motion vector of the current block.

Mode information of the current block may also be transmitted to a decoder. The mode information of the current block indicates that the current block is in a skip macroblock mode. In the skip macroblock mode, it is not necessary to transmit motion information of the current block to the decoder, thereby reducing the amount of information transmitted to the decoder. In the skip macroblock mode, the decoder may compare the sizes of neighboring partitions around the current block and use a motion vector of the larger neighboring partition as a motion vector of the current block, like in the encoder.

Figure 3:
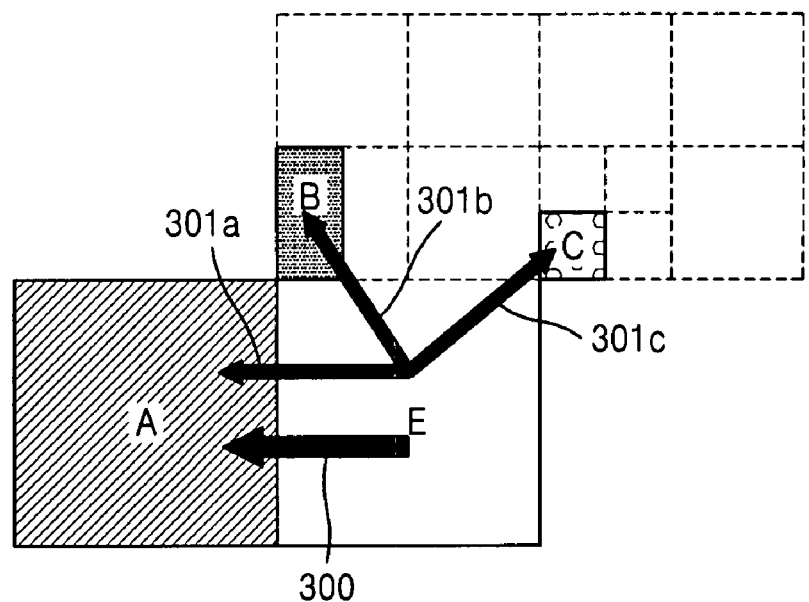
FIG. 3 illustrates neighboring partitions used to estimate a motion vector according to an exemplary embodiment of the present invention.

FIG. 3 illustrates neighboring partitions used to estimate a motion vector according to an exemplary embodiment of the present invention. According to the prior art, a motion vector 300 of the current block E is estimated as a median value of a motion vector 301a of a block (or partition) A, a motion vector 301b of a block (or partition) B, and a motion vector 301c of a block (or partition) C and the motion vector 300 is estimated as 0 when one of the motion vector 301a and the motion vector 301b is 0. However, according to the present invention, when the size of the partition A and the size of the partition B are different from each other, the motion vector 300 of the current block E is a motion vector of the larger one of the partition A and the partition B, i.e., the motion vector 301a of the partition A.

Figure 4:
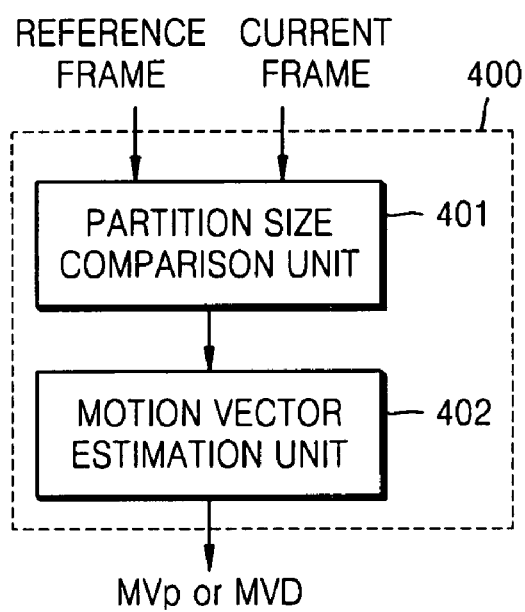
FIG. 4 is a block diagram of an apparatus for estimating a motion vector using the sizes of neighboring partitions according to an exemplary embodiment of the present invention.

FIG. 4 is a block diagram of an apparatus 400 for estimating a motion vector using the sizes of neighboring partitions according to an exemplary embodiment of the present invention, in which the apparatus 400 includes a partition size comparison unit 401 and a motion vector estimation unit 402.

Referring to FIG. 4, the partition size comparison unit 401 compares the size of a first neighboring partition located uppermost among neighboring partitions located to the left of a current block with the size of a second neighboring partition located leftmost among neighboring partitions located above the current block. The comparison result is output to the motion vector estimation unit 402.

The motion vector estimation unit 402 estimates a motion vector of the larger one of the first neighboring partition and the second neighboring partition as a motion vector of the current block according to the comparison result output from the partition size comparison unit 401.

Figure 5:
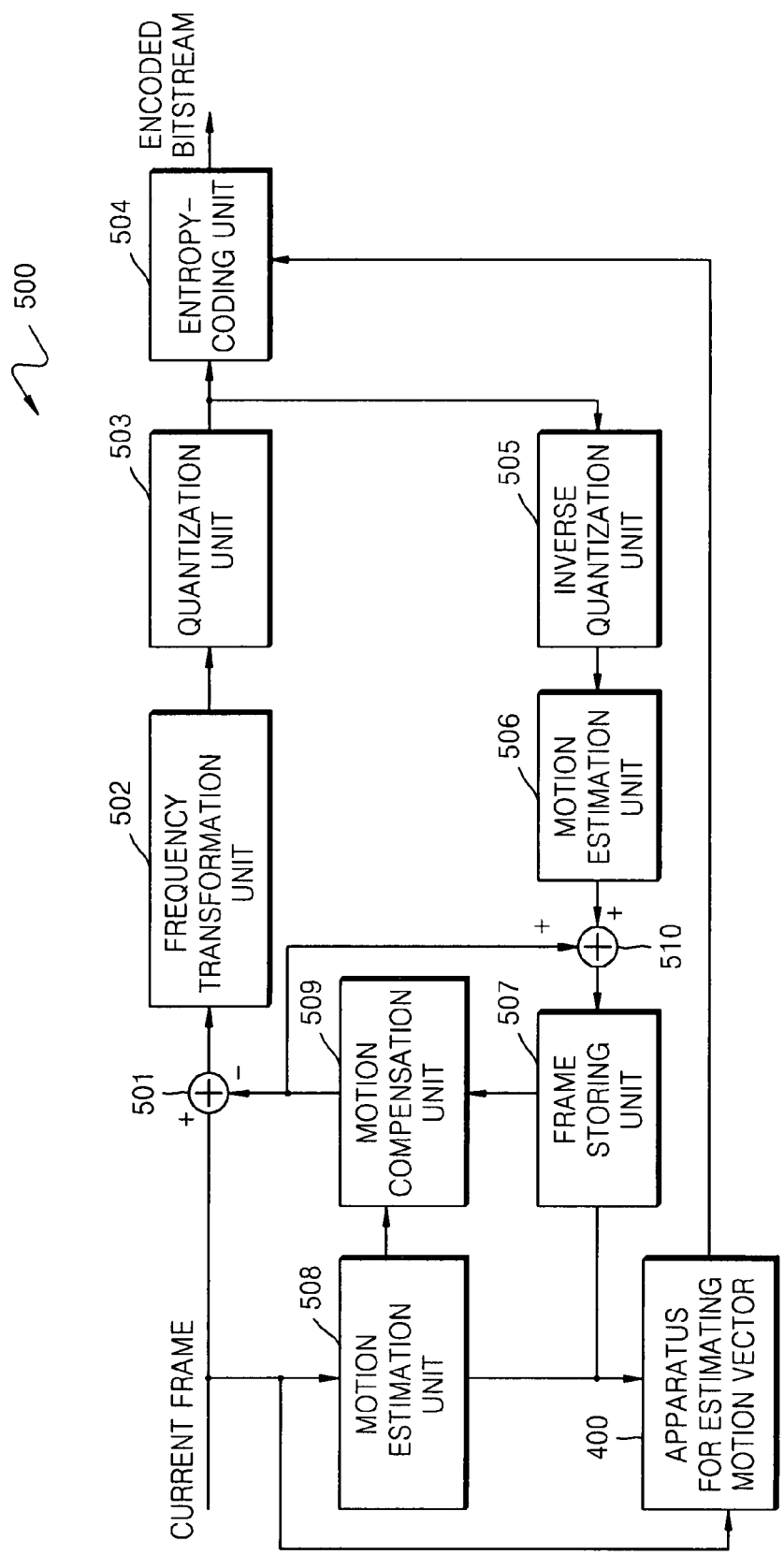
FIG. 5 is a block diagram of an encoder including an apparatus for estimating a motion vector using the sizes of neighboring partitions according to an exemplary embodiment of the present invention.

FIG. 5 is a block diagram of an encoder 500 including the apparatus 400 according to an exemplary embodiment of the present invention.

Referring to FIG. 5, an addition unit 501 calculates a difference between image data of a current frame input from the outside and motion-compensated video data received from a motion compensation unit 509 and transmits the difference to a frequency transformation unit 502. If a current macroblock is subject to inter-mode coding, the addition unit 501 outputs the difference between the image data input from the outside and the motion-compensated image data to the frequency transformation unit 502. In the following description, the image data means block-based data.

The frequency transformation unit 502 applies a discrete cosine transformation (DCT) to image data received from the addition unit 501 in order to convert spatial-domain values into frequency-domain values and outputs the transformed frequency-domain values to a quantization unit 503.

The quantization unit 503 quantizes the frequency-domain values received from the frequency transformation unit 502 and outputs the quantized frequency-domain values to an entropy-coding unit 504.

The entropy-coding unit 504 performs entropy-coding on the quantized frequency-domain values received from the quantization unit 503 and mode information of a current block received from the apparatus 400, thereby generating an encoded bitstream.

An inverse quantization unit 505, an inverse frequency transformation unit 506, a frame storing unit 507, a motion estimation unit 508, a motion compensation unit 509, and the apparatus 400 constitute a set for motion compensation.

The inverse quantization unit 505 performs inverse quantization on the quantized frequency-domain values received from the quantization unit 503 and outputs the inversely quantized frequency-domain values to the inverse frequency transformation unit 506.

The inverse frequency transformation unit 506 transforms the inversely quantized frequency-domain values received from the inverse quantization unit 505 into spatial-domain values and outputs the spatial-domain values to an addition unit 510.

The addition unit 510 adds image data output from the inverse frequency transformation unit 506 to image data received from the motion compensation unit 509, thereby generating reference image data for motion compensation. The generated reference image data is stored in the frame storing unit 507.

The frame storing unit 507 stores image data of a reference frame received from the addition unit 510.

The motion estimation unit 508 performs motion estimation between image data of a current frame input from the outside and image data stored in the frame storing unit 507, thereby generating motion vectors. The motion vectors generated by the motion estimation unit 508 are transmitted to the motion compensation unit 509.

The motion compensation unit 509 performs motion compensation on image data stored in the frame storing unit 507 using the motion vectors generated by the motion estimation unit 508, thereby generating motion-compensated image data. The motion-compensated image data is transmitted to the addition unit 501 and the addition unit 510.

The apparatus 400 includes the partition size comparison unit 401 and the motion vector estimation unit 402 as illustrated in FIG. 4.

The partition size comparison unit 401 compares the size of a first neighboring partition located uppermost among neighboring partitions located to the left of a current block with the size of a second neighboring partition located leftmost among neighboring partitions located above the current block. The comparison result is output to the motion vector estimation unit 402.

The motion vector estimation unit 402 estimates a motion vector of the larger one of the first neighboring partition and the second neighboring partition as a motion vector of the current block according to the comparison result output from the partition size comparison unit 401.

The apparatus 400 transmits mode information of the current block to the entropy-coding unit 504. When the current block is in a skip macroblock mode, it is not necessary to transmit motion information of the current block to a decoder and the decoder may compare the sizes of neighboring partitions around the current block and use a motion vector of the larger one of the neighboring partitions as a motion vector of the current block like in an encoder.

Figure 6:
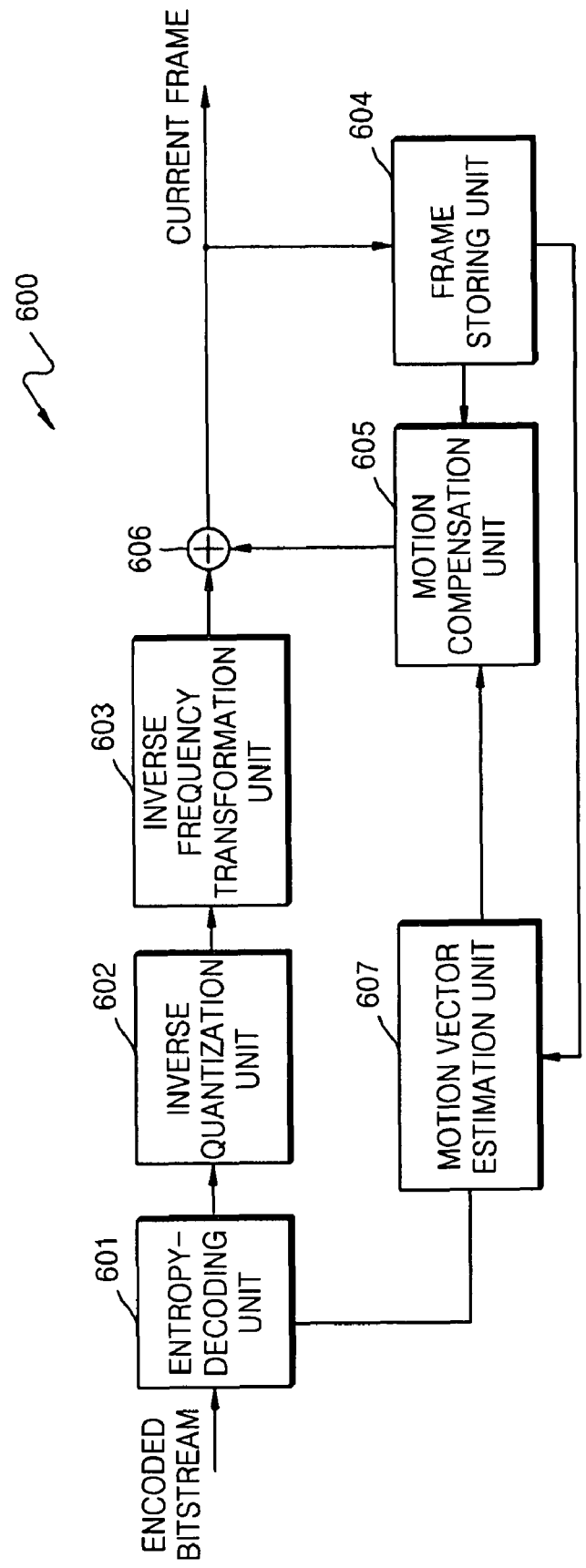
FIG. 6 is a block diagram of a decoder according to an exemplary embodiment of the present invention.

FIG. 6 is a block diagram of a decoder 600 according to an exemplary embodiment of the present invention, in which the decoder 600 includes an entropy-decoding unit 601, an inverse quantization unit 602, an inverse frequency transformation unit 603, a frame storing unit 604, a motion compensation unit 605, an addition unit 606, and a motion vector estimation unit 607. The inverse quantization unit 602, the inverse frequency transformation unit 603, the frame storing unit 604, the motion compensation unit 605, and the addition unit 606 constitute a macroblock reconstruction unit.

Referring to FIG. 6, the entropy-decoding unit 601 performs entropy-decoding on an encoded bitstream and transmits the entropy-decoded bitstream to the inverse quantization unit 603 and the motion vector estimation unit 607. In particular, in the case of inter-mode coding, the entropy-decoding unit 601 extracts mode information of a current block and entropy-decoded image data and outputs the extracted image data to the inverse quantization unit 602 and the extracted mode information to the motion vector estimation unit 607.

The inverse quantization unit 602 performs inverse quantization on the entropy-decoded image data output from the entropy-decoding unit 602 and outputs the inversely quantized image data to the inverse frequency transformation unit 603.

The inverse frequency transformation unit 603 transforms the inversely quantized image data output from the inverse quantization unit 602 into spatial-domain values and outputs the spatial-domain values to the addition unit 606.

The addition unit 606 adds the motion-compensated image data received from the motion compensation unit 605 to the inversely quantized image data received from the inverse frequency transformation unit 603, thereby generating reconstructed image data.

The frame storing unit 604 stores image data of a frame output from the addition unit 606.

The motion vector estimation unit 607 estimates a motion vector of the current block based on the mode information extracted by the entropy-decoding unit 601. The estimated motion vectors are output to the motion compensation unit 605. In other words, if the mode information indicates a skip macroblock mode, the motion vector estimation unit 607 compares the size of a neighboring partition located uppermost among neighboring partitions located to the left of the current block with the size of a neighboring partition located leftmost among neighboring partitions located above the current block and estimates a motion vector of the larger one of those neighboring partitions as a motion vector of the current block.

The motion compensation unit 605 applies a motion vector received from the motion vector estimation unit 607 to image data of a reference frame stored in the frame storing unit 604, thereby performing motion compensation. The motion-compensated image data is output to the addition unit 606.

Figure 7:
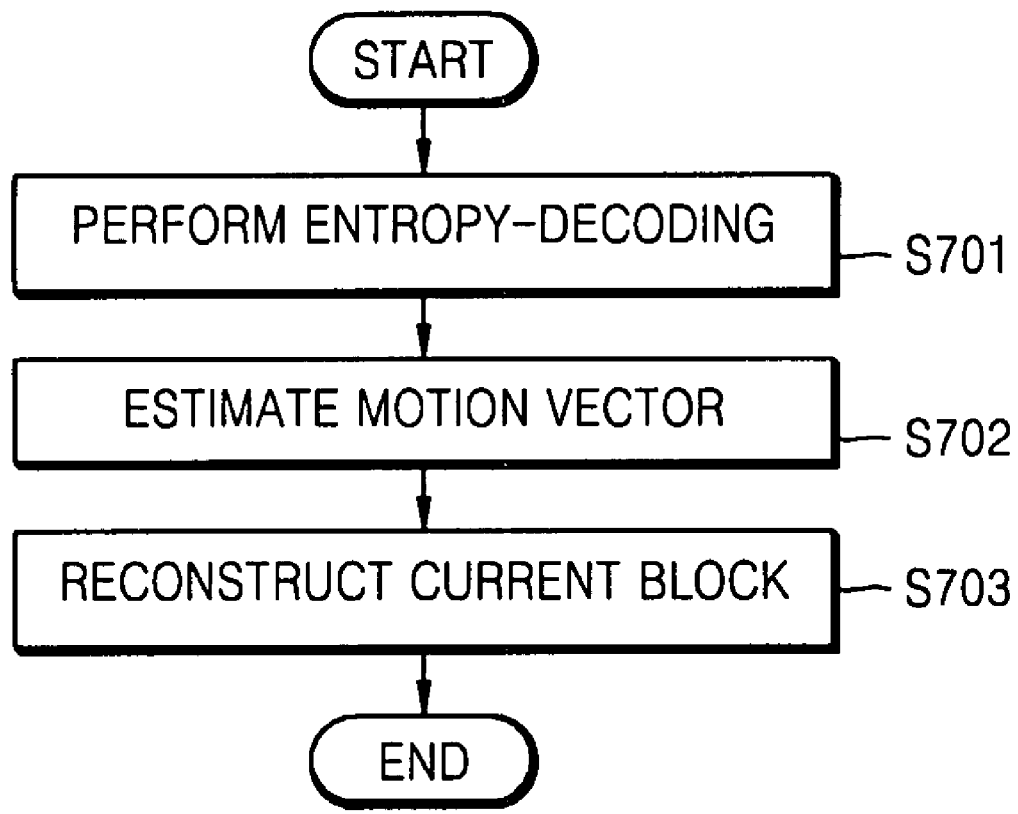
FIG. 7 is a flowchart of a decoding method according to an exemplary embodiment of the present invention.

FIG. 7 is a flowchart of a decoding method according to an exemplary embodiment of the present invention.

Referring to FIG. 7, entropy-decoding is performed on a residual block and mode information of a current block from an encoded bitstream in operation S701.

In operation S702, a motion vector of the current block is estimated using the mode information.

More specifically, the size of a neighboring partition located uppermost among neighboring partitions located to the left of the current block is compared with the size of a neighboring partition located leftmost among neighboring partitions located above the current block based on the mode information. A motion vector of the larger one of those neighboring partitions is estimated as a motion vector of the current block according to the comparison result.

In operation S703, the motion vector estimated in operation S702 is applied to the decoded residual block, thereby reconstructing the current block.

As described above, according to the present invention, by estimating a motion vector of a current block to the exclusion of an assumption made by H.264 that the motion vector of the current block is estimated as 0 when a motion vector of a neighboring partition around the current block is 0, the amount of information transmitted to a decoder can be reduced.

Meanwhile, the present invention can also be embodied as computer-readable code on a computer-readable recording medium. The computer-readable recording medium is any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over a network of coupled computer systems so that the computer-readable code is stored and executed in a decentralized fashion.

While the present invention has been particularly shown and described with reference to an exemplary embodiment thereof, it will be understood by those of ordinary skill in the art that various changes in form and detail may be made therein without departing from the spirit and scope of the present invention as defined by the following claims.

What is claimed is:

1. A method of estimating a motion vector of a current block using motion vectors of neighboring partitions around the current block, the method comprising:
    comparing a size of a first neighboring partition located to a left of the current block with a size of a second neighboring partition located above the current block; and
    if the size of the first neighboring partition and the size of the second neighboring partition are different, estimating a motion vector of a larger one of the first neighboring partition and the second neighboring partition as the motion vector of the current block.

2. The method of claim 1, wherein the first neighboring partition is located uppermost among neighboring partitions located to the left of the current block and the second neighboring partition is located leftmost among neighboring partitions located above the current block.

3. The method of claim 1, wherein the current block is composed of 16×16 pixels.

4. The method of claim 1, wherein the size of the first neighboring partition is one of 16×16, 16×8, 8×16, 8×4, 4×8, and 4×4 and the size of the second neighboring partition is one of 16×16, 16×8, 8×16, 8×4, 4×8, and 4×4 and the size of the first and the size of the second neighboring partitions are different.

5. The method of claim 1, further comprising transmitting mode information of the current block.

6. A non-transitory computer-readable recording medium having recorded thereon a program for implementing the method claimed in claim 1.

7. An apparatus for estimating a motion vector of a current block using motion vectors of neighboring partitions around the current block, the apparatus comprising:
    a partition size comparison unit which compares a size of a first neighboring partition located to a left of the current block with a size of a second neighboring partition located above the current block; and
    a motion vector estimation unit which, if the size of the first neighboring partition and the size of the second neighboring partition are different, estimates a motion vector of a larger one of the first neighboring partition and the second neighboring partition as the motion vector of the current block.

8. The apparatus of claim 7, wherein the first neighboring partition is located uppermost among neighboring partitions located to the left of the current block and the second neighboring partition is located leftmost among neighboring partitions located above the current block.

9. The apparatus of claim 7, wherein the current block is composed of 16×16 pixels.

10. The apparatus of claim 7, wherein the size of the first neighboring partition is one of 16×16, 16×8, 8×16, 8×4, 4×8, and 4×4 and the size of the second neighboring partition is one of 16×16, 16×8, 8×16, 8×4, 4×8, and 4×4 and the size of the first and the size of the second neighboring partitions are different.

11. The apparatus of claim 7, wherein the motion vector estimation unit transmits mode information of the current block.

12. A video encoder comprising:
    a motion vector estimation apparatus which compares a size of a first neighboring partition located to a left of a current block with a size of a second neighboring partition located above the current block and, if the size of the first neighboring partition and the size of the second neighboring partition are different, estimates a motion vector of a larger one of the first neighboring partition and the second neighboring partition as a motion vector of the current block; and
    an entropy-coding unit which performs entropy-coding on mode information of the current block.

13. The video encoder of claim 12, wherein the first neighboring partition is located uppermost among neighboring partitions located to the left of the current block and the second neighboring partition is located leftmost among neighboring partitions located above the current block.

14. The video encoder of claim 12, wherein the current block is composed of 16×16 pixels.

15. The video encoder of claim 12, wherein the size of the first neighboring partition is one of 16×16, 16×8, 8×16, 8×4, 4×8, and 4×4 and the size of the second neighboring partition is one of 16×16, 16×8, 8×16, 8×4, 4×8, and 4×4 and the size of the first and the size of the second neighboring partitions are different.

16. A video decoder comprising:
   an entropy-decoding unit which performs entropy-decoding on a residual block and mode information of a current block from an encoded bitstream;
   a motion vector estimation unit which compares a size of a first neighboring partition located to a left of the current block with a size of a second neighboring partition located above the current block based on the decoded mode information and estimates a motion vector of a larger one of the first neighboring partition and the second neighboring partition as a motion vector of the current block; and
   a macroblock reconstruction unit which reconstructs the current block from the decoded residual block using the estimated motion vector of the current block.

17. The video decoder of claim 16, wherein the first neighboring partition is located uppermost among neighboring partitions located to the left of the current block and the second neighboring partition is located leftmost among neighboring partitions located above the current block.

18. The video decoder of claim 16, wherein the current block is composed of 16×16 pixels.

19. The video decoder of claim 16, wherein the size of the first neighboring partition is one of 16×16, 16×8, 8×16, 8×4, 4×8, and 4×4 and the size of the second neighboring partition is one of 16×16, 16×8, 8×16, 8×4, 4×8, and 4×4, and the size of the first and the size of the second neighboring partitions are different.

20. A decoding method, comprising:
   performing entropy-decoding on a residual block and mode information from an encoded bitstream;
   comparing a size of a first neighboring partition located to a left of a current block with a size of a second neighboring partition located above the current block based on the decoded mode information;
   estimating a motion vector of a larger one of the first neighboring partition and the second neighboring partition as a motion vector of the current block according; and
   reconstructing the current block from the decoded residual block using the estimated motion vector of the current block.

21. The decoding method of claim 20, wherein the first neighboring partition is located uppermost among neighboring partitions located to the left of the current block and the second neighboring partition is located leftmost among neighboring partitions located above the current block.

22. The decoding method of claim 20, wherein the current block is composed of 16×16 pixels.

23. The video decoding method of claim 20, wherein the size of the first neighboring partition is one of 16×16, 16×8, 8×16, 8×4, 4×8, and 4×4 and the size of the second neighboring partition is one of 16×16, 16×8, 8×16, 8×4, 4×8, and 4×4, and the size of the first and the size of the second neighboring partitions are different.

24. A non-transitory computer-readable recording medium having recorded thereon a program for implementing the decoding method claimed in claim 20.

* * * * *